United States Patent [19]

Carey

[11] Patent Number: 5,652,755
[45] Date of Patent: Jul. 29, 1997

[54] PRINTER INTERFACE SYSTEM

[75] Inventor: Brian Carey, Cupertino, Calif.

[73] Assignee: Boehringer Mannheim Corporation, Indianapolis, Ind.

[21] Appl. No.: 191,423

[22] Filed: Feb. 3, 1994

[51] Int. Cl.$^6$ .............. A61B 5/00; H04B 3/54; H04L 1/00
[52] U.S. Cl. .............. 371/57.1; 340/310.02; 340/310.03; 340/538
[58] Field of Search .............. 340/538, 310.01, 340/310.02, 310.03, 310.04, 310.05; 364/413.01, 413.02, 413.03, 413.07; 371/37.1, 49.1, 57.1

[56] References Cited

U.S. PATENT DOCUMENTS

| | | | |
|---|---|---|---|
| 3,839,708 | 10/1974 | Bredesen et al. | 395/112 |
| 4,281,394 | 7/1981 | Fox et al. | 364/413.02 |
| 4,315,309 | 2/1982 | Coli | 364/413.02 |
| 4,413,250 | 11/1983 | Porter et al. | 340/310.01 |
| 4,520,488 | 5/1985 | Houvig et al. | 375/216 |
| 4,546,436 | 10/1985 | Schneider et al. | 364/413.02 |
| 4,803,625 | 2/1989 | Fu et al. | 364/413.03 |
| 4,806,905 | 2/1989 | McGowan, III et al. | 340/310.02 |
| 4,835,372 | 5/1989 | Gombrich et al. | 235/375 |
| 4,910,628 | 3/1990 | Minagawa et al. | 361/84 |
| 5,032,819 | 7/1991 | Sakuragi et al. | 340/310.05 |
| 5,438,678 | 8/1995 | Smith | 395/750 |

OTHER PUBLICATIONS

Slater, M., "Microprocessor-Based Design", Mayfield Publishing Co., pp. 412–445 Oct. 1987.

*Primary Examiner*—Stephen M. Baker
*Attorney, Agent, or Firm*—Cooley Godward LLP

[57] ABSTRACT

Monitor (11) includes a microcontroller (51) programmed in a first mode of operation to drive various loads (59), (69) which operate to perform tests on patient samples. The results of the tests are sensed by sensors (61), (75) and digitally stored in storage (67) for display on display (21). The microcontroller (51) is programmed in a second mode of operation to transmit the stored displayed information to a printer (13) over the line (23) transmitting power to the monitor (11) by selectively routing current through the load (69). A data transmission interface (15) includes circuitry (37) (39) (43) for sensing the changing current provided to the monitor (11) for decoding the information to be printed and for sending print information to printer (13). Error checking is performed by microprocessor (39) which inhibits all printing if any errors occur in the received message.

8 Claims, 9 Drawing Sheets

PRINTER INTERFACE SYSTEM

BACKGROUND

The present invention relates to a data transmission interface for transmitting data between a system and an utilization device, such as a printer, and more particularly, to an interface which utilizes the system's power connection to effect the data transmission.

Various data transmission interfaces exist in the prior art for transmitting information from a system unit, such as a computer, to an utilization device, such as a printer. These interfaces include both parallel and serial data transmission and usually consist of a separate dedicated channel over which the information is transmitted. Both the system unit and the printer unit are often powered by differing power sources connected directly thereto. Further, it is known to transmit information over a power distribution system such as that found in a household or office. Such systems are employed in conjunction with microprocessors to control various household devices, such as burglar alarms.

Patient monitor devices are also known which operate to analyze patient samples and provide an output indication of the results of the analysis on a temporary display device. These devices are generally small allowing for portability so that they can be placed near a patient and thus do not incorporate a self-contained mechanism for creating a permanent record such as a printer. An example of such a patient monitor is the Biotrack 512 monitor. This monitor may be disconnected from its power source and operate on battery power while temporarily being located adjacent to patient in order to collect and analyze patient samples. The monitor may then be plugged back into its power source in order to recharge its batteries or perform analysis on patient samples brought to the monitor. It is important that simple connections be established between the monitor and the utilization device in order to prevent setup error as well as to conserve space and thus to make the system readily portable.

While the above summarized prior art is useful in providing data communication between devices, it does not suggest an approach which relies on a simple connection of both power and signal communication facilities between a portable monitor and an utilization device, such as a printer, operating in an environment where communication must be error-free in order to insure accuracy in the communicated data.

SUMMARY OF THE INVENTION

Therefore, an object of the invention is to utilize the power source of a display monitor to effect communication between the monitor and an utilization device, such as a printer.

It is a further object of the invention to provide code generation means in a monitor utilizing its internal processing circuits and a selected load circuit in order to effect the data communication to the printer.

An additional object of the invention is to incorporate error detection circuitry to insure the complete accuracy of the data transmission between the monitor and the printer and to inhibit the printing whenever any transmission error is detected in order to prevent the printing of any patient information that might be in error.

It is an additional object of the invention to utilize the monitor's microprocessor to perform both patient analysis and to perform signal modulation for data communication by employing a load device which is used in a first set of circumstances to provide patient analysis and in a second set of circumstances to provide data communication.

In accordance with the objects of the invention, the data transmission interface of the invention comprises a power means for providing a constant voltage varying current power to the display monitor, a microprocessor within the display monitor responsive to an initiation signal to modulate the current provided by the power means in accordance with data representing patient information that has been temporarily stored in a storage means connected to the microprocessor by selectively routing current through a load device and detection means physically separate from the display monitor and connected to an utilization device, such as a printer, for demodulating the current signal and providing an output signal to the printer to effect printing of the data stored in the monitor. Additionally, the microprocessor is programmed to insert error check code information such as hamming code into the data in order to enable the detection means to insure that characters are received without any bit dropout. The detection means is responsive to the receipt of error information indicating incorrect transmission to inhibit the printing of the entire record previously erroneously transmitted in order to prevent the printing of any incorrect patient information.

In a second mode of operation, the monitor utilizes its microprocessor and the load device which may be a light emitting diode or the like in order to perform analysis on patient samples. The connection to the printer is thus effected by a programming change in the microprocessor, thus efficiently utilizing the circuitry and apparatus already contained within the monitor in order to provide an additional data communication function. A better understanding of the invention and additional advantages and objects of the invention will become apparent to those skilled in the art upon reference to the detailed description in the accompanying drawings.

DETAILED DESCRIPTION OF THE PREFERRED EMBODIMENT

Figure 1:
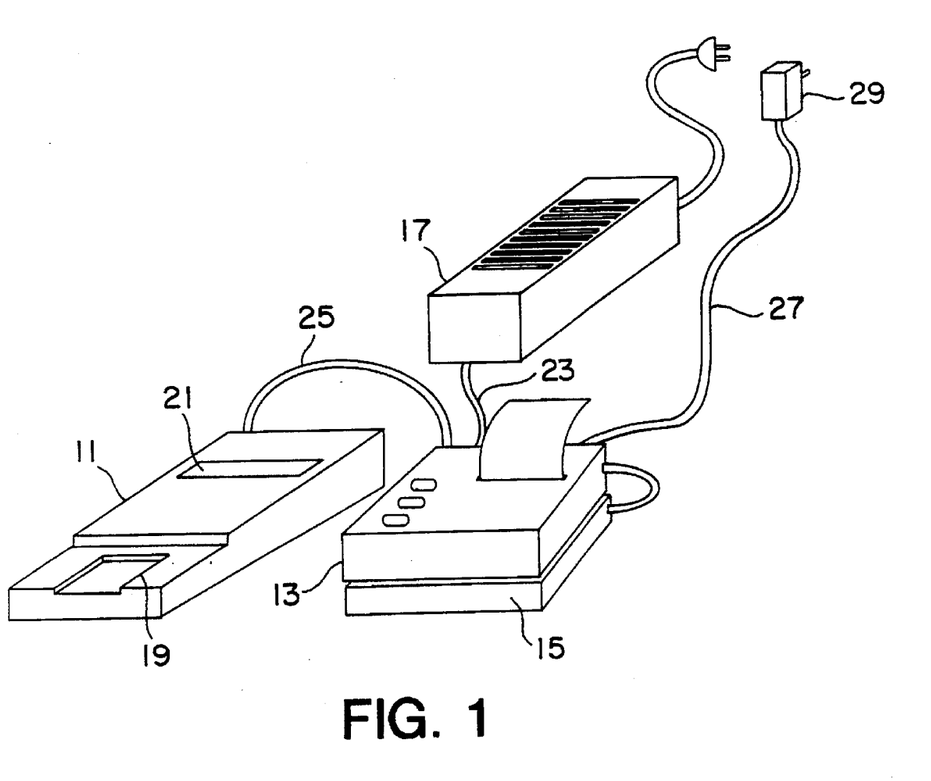
FIG. 1 is a diagrammatic view of the data transmission interface system configuration.

Referring now to the drawings and more particularly to FIG. 1 thereof, a diagrammatic view of the data transmission interface system configuration is depicted. The system includes a monitor 11, a printer 13, a data transmission interface 15, and a power supply 17. The monitor 11 includes a test bed 19 for receiving patient samples and performing analysis thereon, a display 21 for displaying the results of the analysis and various circuitry (not shown) for performing analysis functions and for transmitting the displayed data to be printed by printer 13. The power supply 17 provides power over cable 23 to the data transmission interface 15 which in turn provides power to monitor 11 over cable 25. Power is provided to the printer 13 through cable 27 which is connected to an independent power source 29.

Figure 2:
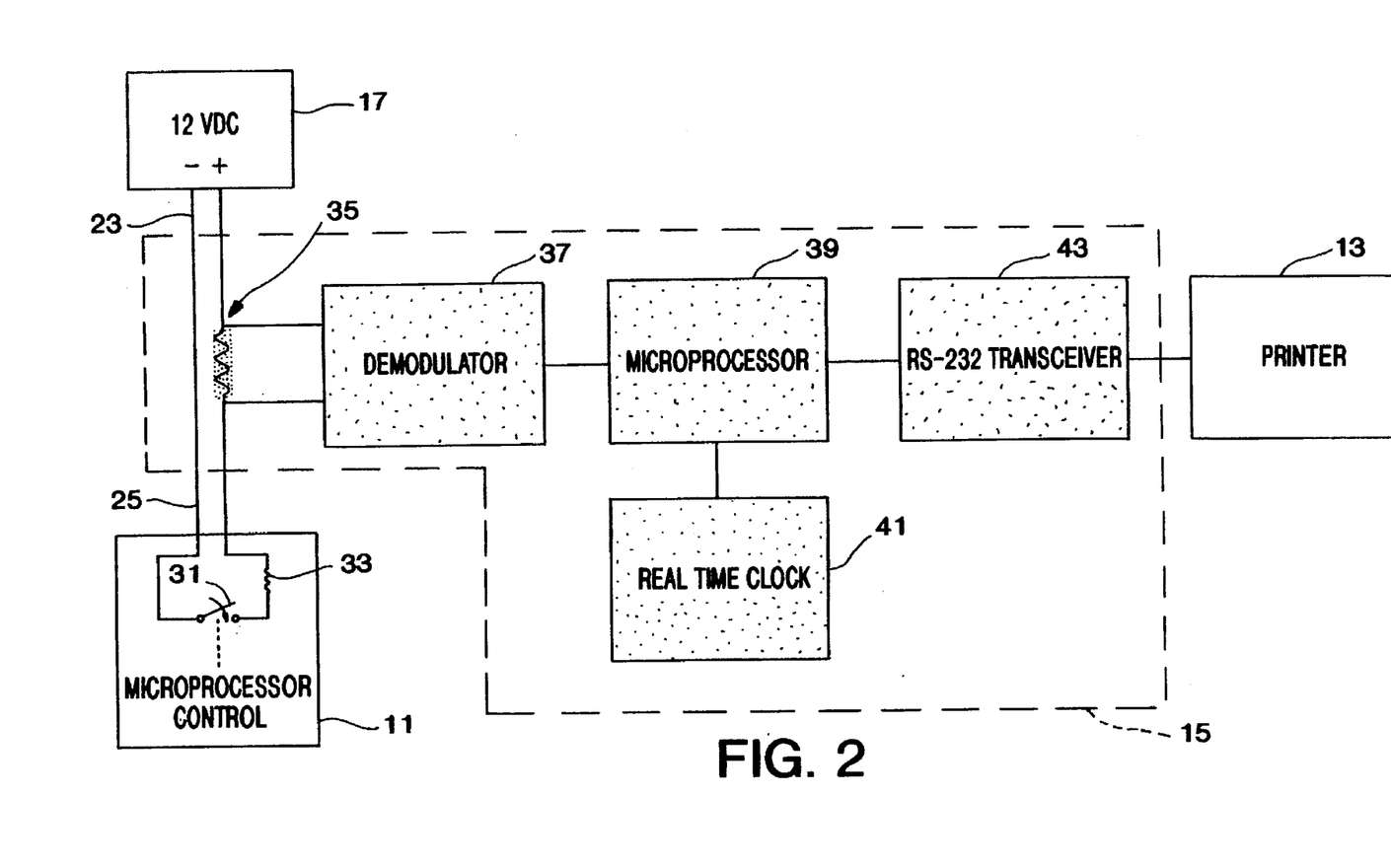
FIG. 2 is a block diagram of the data transmission interface system configuration.

Referring now to FIG. 2 of the drawings, a block diagram of the data transmission interface system configuration is depicted. The power supply 17 provides a constant voltage varying current source of power to the monitor 11. In order to communicate data from the monitor 11 to the printer 13, the current provided by the power supply 17 is modulated by the monitor 11 with a binary signal representation of the data. The monitor 11 effects this signal modulation by opening and closing the switch 31 under the control of a microcontroller thereby causing current from the power supply 17 to be routed through the load resistor 33. The modulated current signal is converted to a voltage waveform by the resistor 35 and the voltage signal is demodulated by the demodulator 37 and provided to the microprocessor 39. The demodulated signal is checked for accuracy by the microprocessor 39 and combined with other information, such as information from a real-time clock 41 and then converted into universally recognized printer codes such as that transmitted over an RS 232 interface in order to provide the printer 13 with a signal that is readily converted into character printing information. The resistor 35, the modulator 37, the microprocessor 39, the real-time clock 41 and the RS 232 transceiver 43 are located in the data transmission interface 15.

Figure 3:
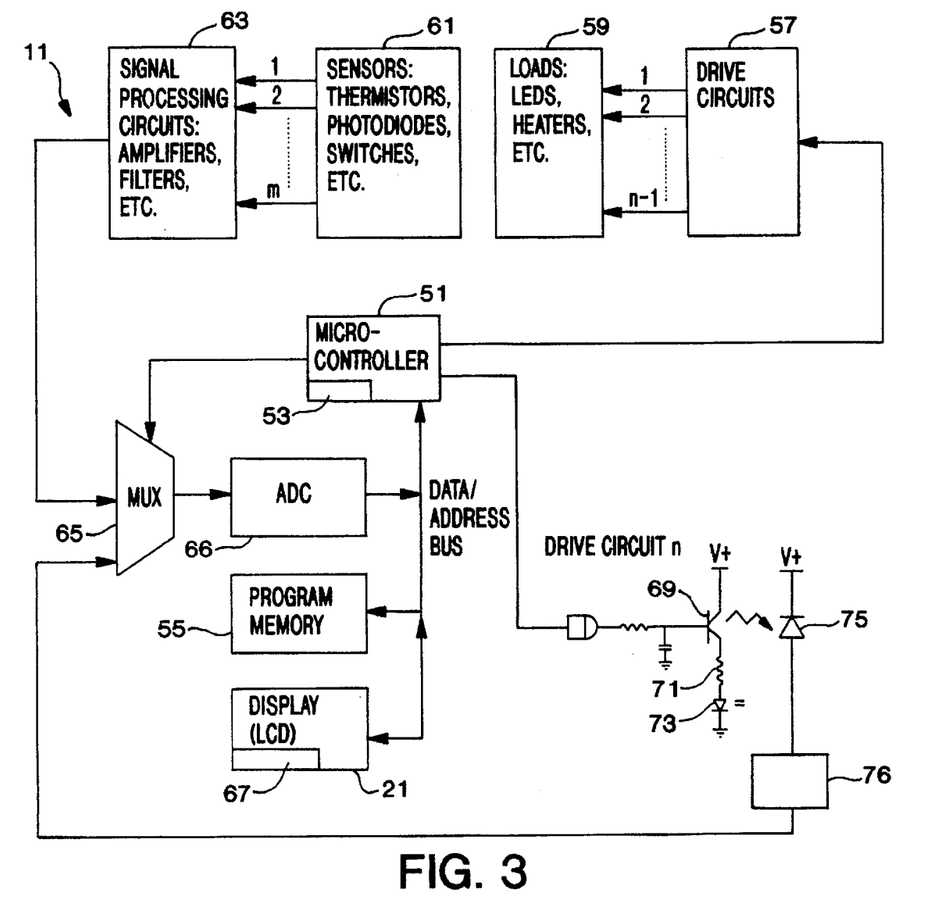
FIG. 3 is a block diagram of the monitor.

Referring now to FIG. 3 of the drawings, a block diagram of the monitor 11 is depicted. The monitor 11 includes a microcontroller 51, which controls a sequence of analysis operations performed on a patient sample. The microcontroller 51 can be an Intel 8031 microcontroller which includes a 128-byte random access memory 53. A program memory 55 stores a sequence of instructions therein which define the operational sequence of the microcontroller. Acting in response to the stored program in the program memory 55, the microcontroller provides output signals to drive circuits 57 which drive various circuit loads 59 including heaters, light emitting diodes, etc. Various sensors 61 sense attributes of the patient sample as it is acted upon by loads 59. The signal outputs from the sensors are processed by various circuitry 63 in accordance with the type of information signal obtained and these sensed signals are provided through the multiplexor 65 to the analogue to digital converter 66 and thence to the microcontroller 51.

The microcontroller selects the channel of the multiplexor from which it is desired at that point in the program to receive a signal and to store test results. The resulting information may be stored in the temporary random access storage 53 or may be stored in the temporary storage 67 associated with the liquid crystal display 21. As the analysis progresses, various operator instruction messages can be caused to be displayed in accordance with the resulting information.

By way of example, the microcontroller 51 is responsive to programs stored in the program memory 55 to check and determine whether a patient blood sample is present. When providing this check, the microcontroller 51 drives the base of transistor 69 with a signal that turns the transistor on allowing a current flow from the supply of V+ through the resistor 71 and the light-emitting diode 73. Light reflected from a blood sample is sensed by a photodetector 75 which provides an output signal to the signal processing circuit 76 which amplifies and filters the output signal. The amplified and filtered signal is provided to the multiplexor 67. The microcontroller 51 selects the multiplexor channel containing the signal provided by the photodetector 75 and circuit 76 so that it is converted by the analog to digital converter 66 and stored as binary values in the random access memory 53 of the microcontroller 51. These values are converted to information to be used by the microcontroller to display a message on the LCD display 21 which is routed by the microcontroller to the random access storage 67 of the display 21. The random access storage 67 of the display 21 is adapted to receive a plurality of various inputs in response to the various signal processing circuitry 63 under the control of the microcontroller so as to store several display lines of analysis information or operator instructions.

When it is desirous to transmit the information such as analysis results displayed by the display 21 to the printer 13 of FIG. 2, either an initiation signal from the program memory 55 or an initiation signal from an operator-controlled switch is employed to start the transmission process. The microcontroller 51 is responsive to the initiation signal to cause a series of coded impulses to be supplied to the base of the transistor 69. As will be described, the coded impulses correspond to the data to be transmitted which is stored in the random access storage 67 of the display 21. The microcontroller thus converts this stored information into a series of serially coded character signals which include both data and error check code information as well as control information. The turning on and off of the transistor 69 in accordance with this coded information causes a load current to be drawn from the power supply V+, thereby modulating the current that has been supplied by the power supply. Thus the transistor 69 serves as the switch 31 of FIG. 2 and the resistor 71 and light emitting diode 73 serve as the resistor 33 of FIG. 2. As will be further described, this modulated current is sensed and demodulated by the data transmission interface 15 of FIG. 2.

The microcontroller 51 is programmed to transmit code corresponding to the message characters displayed on the display 21, add a start transmission character and a language character at the beginning of the message characters and add an end transmission character to the end of the message characters. A set of codes is thus created for each character. Hamming error check code bits are added to each character code and a start bit and a stop bit are added to each character code. Each bit of a thusly created character code is then utilized by the microcontroller 51 to control the turn on and turn off of the transistor 69. The microcontroller 51 is programmed to effect a data transmission carrier frequency of 2 kHz with 4 cycles per bit providing an incoming baud rate of 500 bits per second. This frequency was selected since it did not correspond to any frequencies used in the normal operation of the monitor. An amplitude shift keying scheme is employed where one amplitude represents a binary "1" and the other amplitude represents a binary "0".

Figure 4A:
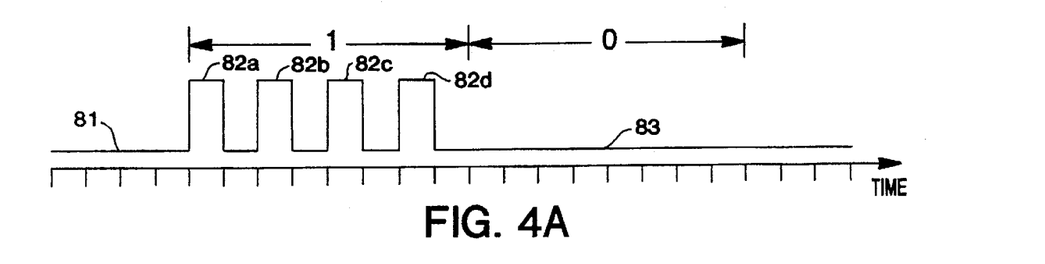
FIGS. 4A and 4B are wave form diagrams of modulated character bits.
Figure 4B:
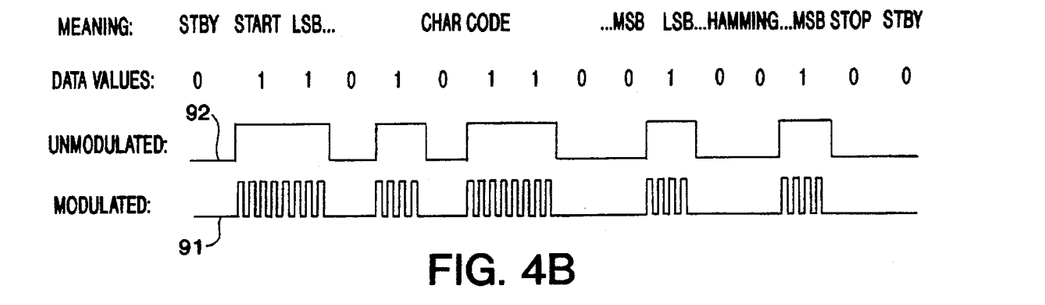

With reference to FIGS. 4A and 4B of the drawings, a wave form diagram of modulated character bits representing the character "5" is depicted. Using the on/off keying technique described, a "1" representation of the wave form 81 is depicted by the 4 positive wave forms 82a–82d and a "0" representation is depicted by the absence of a carrier signal at 83. The wave form 91 shows a modulated output signal representing the numeric character "5". The corresponding unmodulated signal is depicted by wave form 92 which represents the data values depicted thereabove. These data values correspond to a start bit, the least significant bit of the character "5", its remaining bits including its most significant bit as well as the least significant bit of the hamming error check code; its remaining bits including its most significant bit and a stop bit. It is to be noted that two stop bits, a "1" followed by a "0" can be employed to further reduce error due to phase shifted detection.

Figure 5:
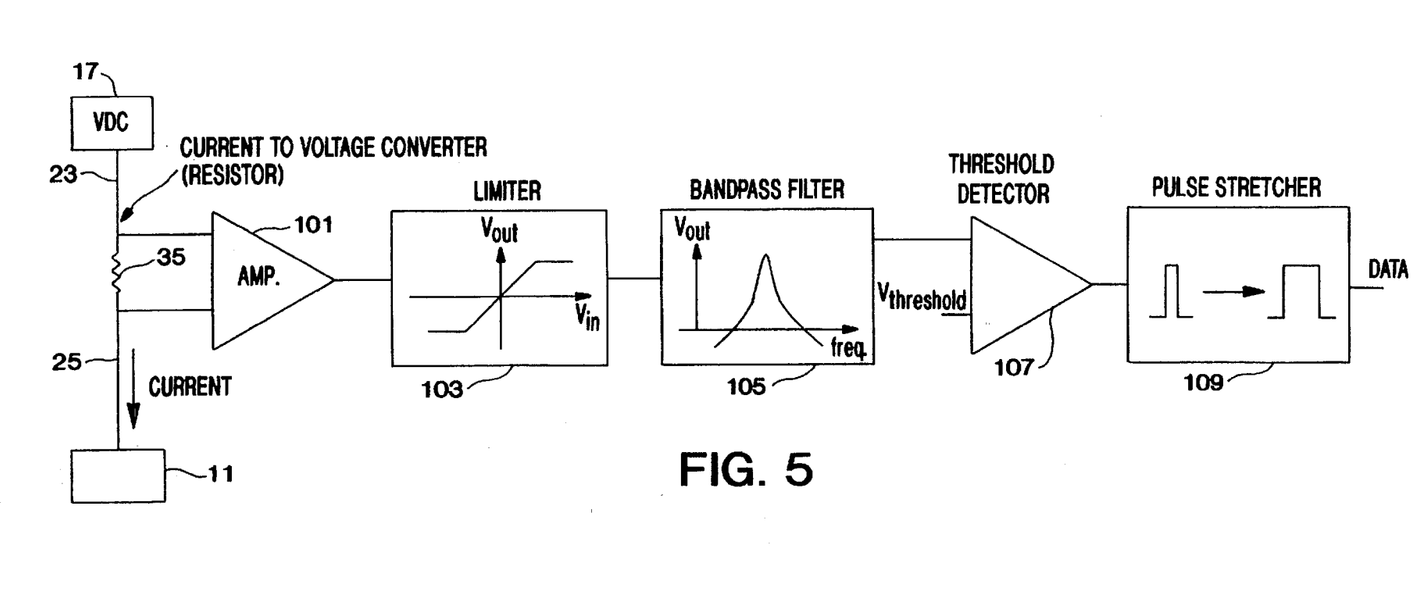
FIG. 5 is a block diagram of the detection circuit.

Referring now to FIG. 5 of the drawing, a block diagram of the detector circuit is depicted. The current supply to the monitor from the power supply 17 passes through the resistor 35 located in the printer interface 15 of FIG. 2. The voltage drop across the resistor 35 is amplified by the amplifier 101. The amplified signal is limited by the limiter 103, filtered by the band pass filter 105, detected by the threshold detector 107, and shaped by the pulse stretcher 109. Since the selected carrier frequency of 2 kHz is different than any frequency used during normal operation of the monitor, the band pass filter 105 may be tuned for this frequency to be effective in passing the desired signal, but not any background signal. Loads that switch much slower than the chosen carrier frequency will effectively look like step functions to the band pass filter 105. Loads that switch much faster will look like impulses. Since step and impulse functions have energy at all frequencies, therefore there will be some stray energy in the pass band of the band pass filter 105. The limiter 103 limits the incoming signal to about the level of the expected signal thereby aiding the band pass filter. The "Q" of the band pass filter 105 and the threshold of the threshold detector 107 are chosen so that at least two carrier cycles are required to overcome the damped response of the filter to the point that the threshold is reached. This insures that a single step or pulse at any frequency will not falsely trip the detector 107.

Figure 6A:
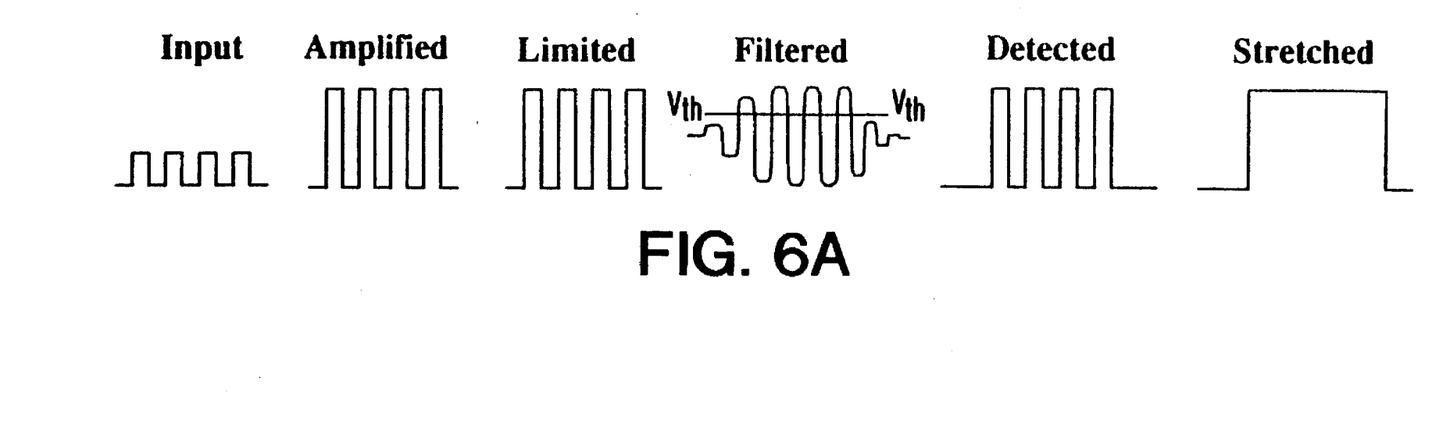
FIGS. 6A and 6B are wave form diagrams of process signals.
Figure 6B:
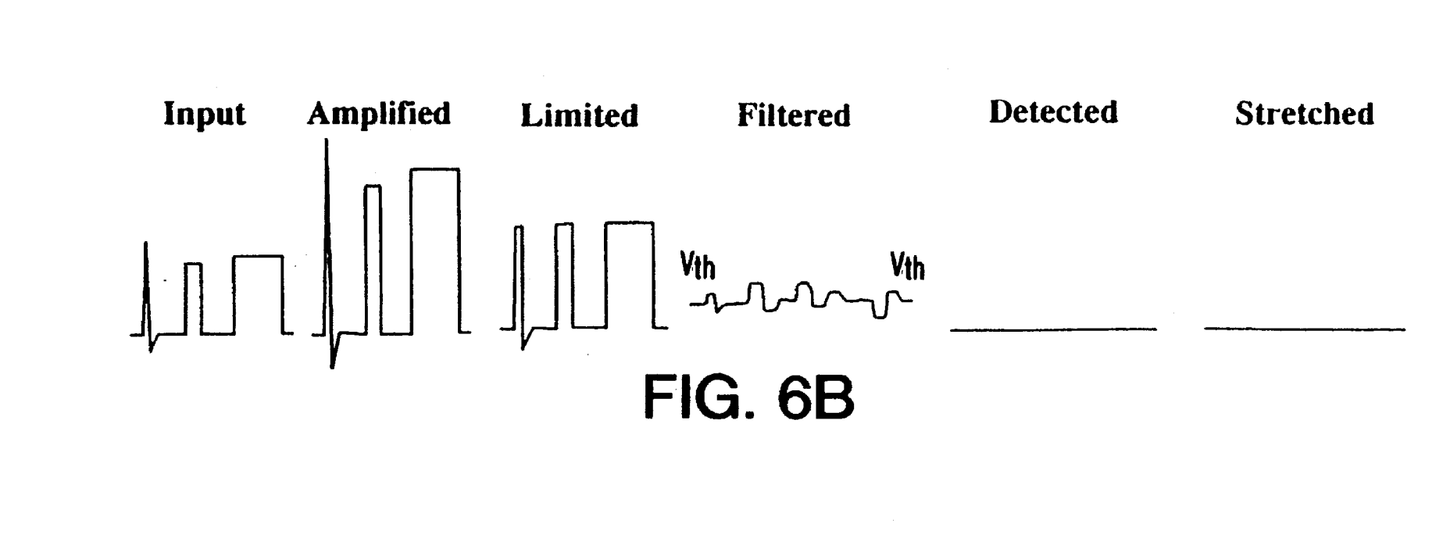

Referring now to FIGS. 6A and 6B of the drawings, a wave form diagram of process signals is depicted. The wave forms of FIG. 4A correspond to the detector processing a desired signal at the various stages of FIG. 5 while the wave form of FIG. 4B depicts an unwanted signal received at the detector of FIG. 5 and its appearance as it is processed by the various circuits of FIG. 5.

Figure 7:
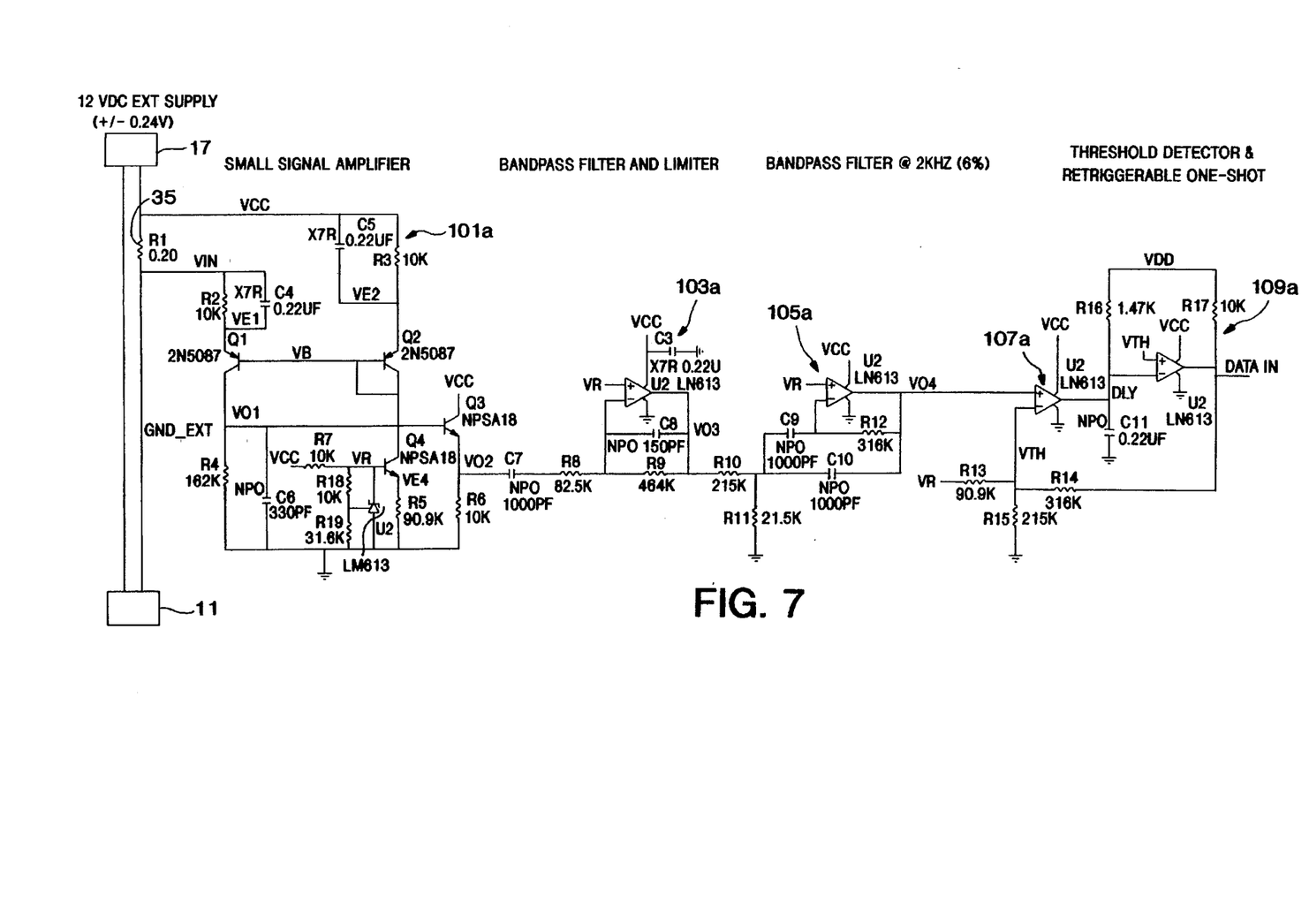
FIG. 7 is a circuit diagram of the analogue demodulator portion of the detection circuit.

Referring now to FIG. 7, a circuit diagram of the analog demodulator portion of the detection circuit depicted in block diagram form in FIG. 5 is shown. The circuit includes a small signal amplifier 101a, a band pass filter and limiter 103a, a band pass filter 105a, a threshold detector 107a, and a retriggerable one-shot 109a which serves as a pulse stretcher. The output signal of the retriggerable one-shot 109a is provided to the digital portion of the detection circuit depicted in FIGS. 8A and 8B. This circuit decodes and stores the incoming signal until a complete and correct message is received. It translates the received code to printer character codes compatible with an RS 232 interface and the printer selected and further effects the transmission of the data to the printer 13 of FIG. 1.

The "Data In" signal from the circuit of FIG. 7 is received by the microprocessor 121 and stored in its internal storage. The microprocessor 121 performs various error checking on the received message and is programmed to inhibit any printing of the received message if an error condition is detected. The following error situations are detected: (1) the 14th bit in any character is not the stop bit, "0"; (2) a hamming code error exists in any character; (3) more than 40 m sec elapses before the start bit of the next character is received; (4) an abort character is received or an end of transmission occurs in the first 34 characters; (5) more than two seconds elapses before an end of transmission character is received; (6) more than 35 characters are received (including the start character and language character before an end of transmission character is received); (7) a start character is received before the current message is completed. Each of the aforenoted error conditions will cause the inhibiting of the transmission of the received message to the printer and no further messages will be transmitted to the printer until a new message is correctly received.

Figure 8A:
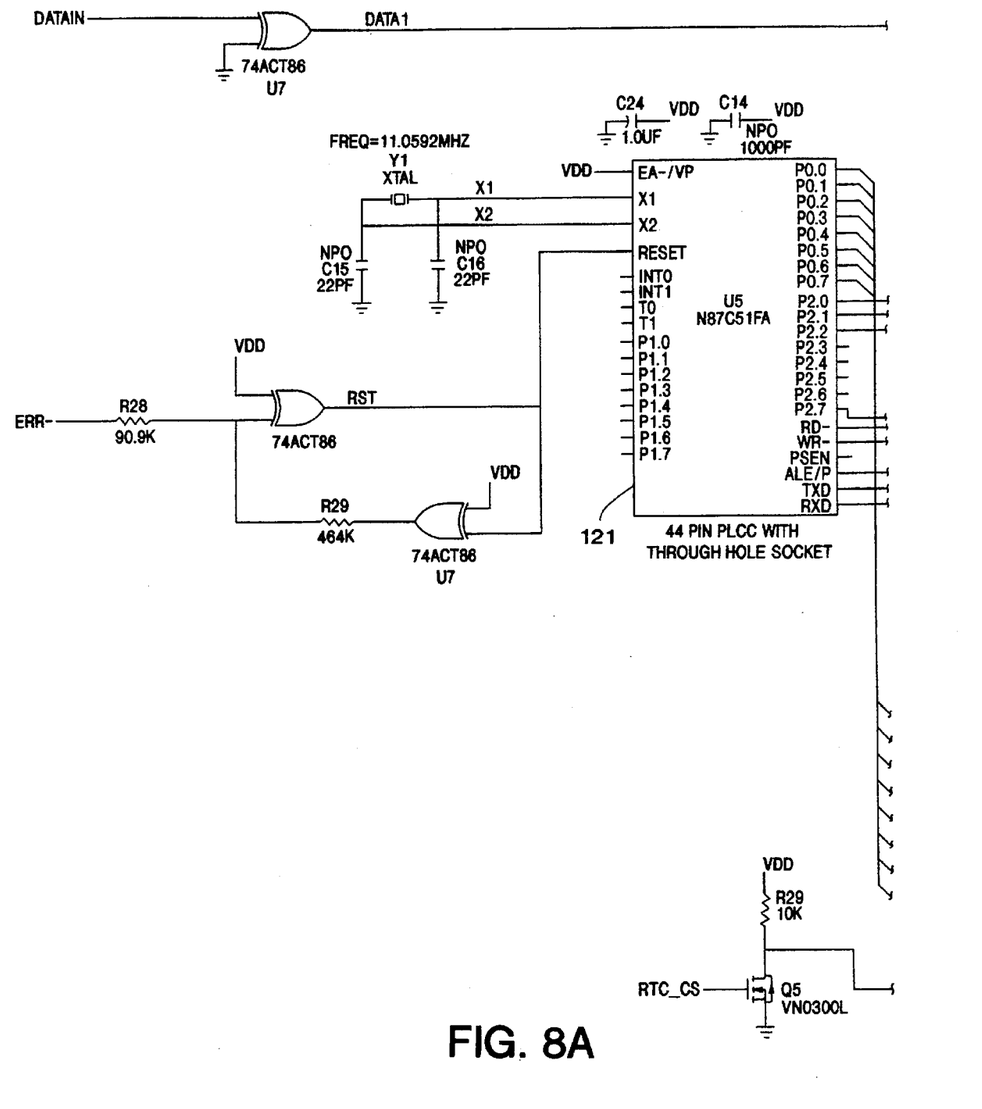
FIGS. 8A and 8B are a circuit diagram of the digital portion of the-detection circuit.
Figure 8B:
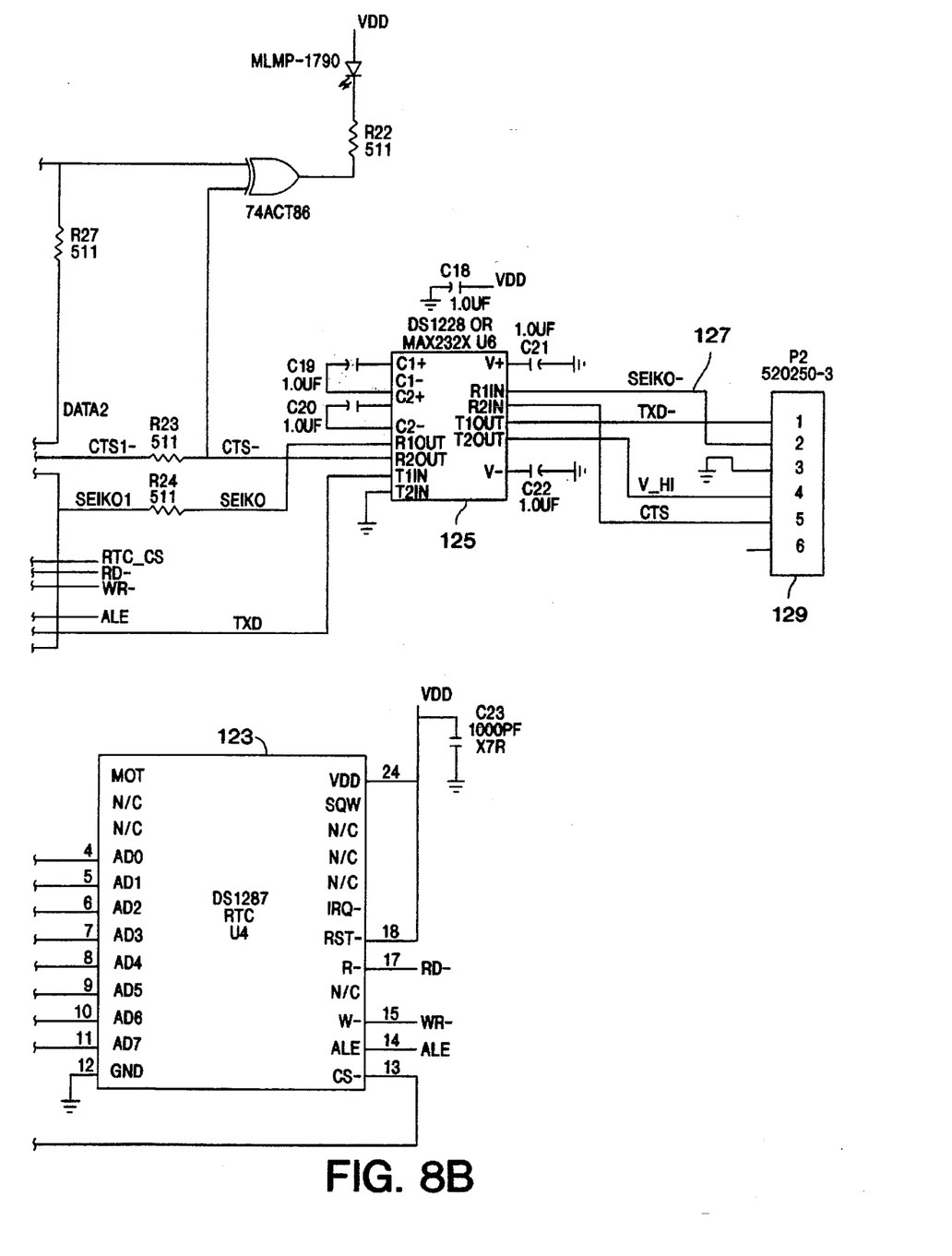

Once the microprocessor 121 determines that an error free message has been received, it adds content to the received message prior to transmitting the message and additional content to the printer. Such additional content includes the time and date provided by the clock circuit 123 via a multiplexed address and data bus. Once the complete message to be printed is assembled by the microprocessor 121, it is sent via line TXD to the RS 232 transceiver 125, which converts the CMOS/TTL level signals to RS 232 levels suitable for receipt by a printer. The data may be configured to a specific printer, such as a Seiko DPU 2016 or Weightonix IMP 2600 in accordance with the signal provided on line 127 to the printer plug 129.

There has been described and illustrated herein a system in accordance with the present invention for transmitting data from a monitor to a printer in order to create an accurate record of patient data analyzed by the monitor. While particular embodiments of the invention have been described, it is not intended that the invention be limited exactly thereto as it is intended that the invention be as broad in scope as the art will permit. Thus, those skilled in the art will recognize that while the utilization device described herein has been described as a printer, it could also be a personal computer or other form of information receiving and displaying device. Additionally, a particular modulation scheme using amplitude modulation of the current applied to the monitor has been disclosed. Other modulation schemes, such as frequency modulation, or phase modulation could also be used. Additionally, the transmission interface device has been shown as a separate device from the printer. This device could of course be designed as an integral part of the printer. Additionally, the printer could be powered from the same power source utilized to supply the monitor. Further, there has been described a constant voltage varying current power supply typically utilized to power conventional circuits. It would be possible to utilize a constant current varying voltage supply and achieve similar results by modulating the voltage input. Therefore, it would be apparent to those skilled in the art that the foregoing and other changes and modifications may be made to the invention as described in the specification without departing from the spirit and scope of the invention as so claimed.

We claim:

1. A data transmission interface for transmitting data temporarily stored in a storage device of a display monitor to a printer, including:

(a) power means for providing a constant voltage varying current power to the display monitor;

(b) initiation signal providing means for providing an initiation signal:

(c) modulation means responsive to the initiation signal providing means and to the storage device for modulating the current provided by said power means in accordance with the data temporarily stored in the storage device by selectively routing current through a load; and (d) detection means coupled to said power means for demodulating the modulated current and for providing an output signal corresponding to the stored data to the printer;

(e) said detection means and said printer being physically separate from said display monitor.

2. A data transmission interface for transmitting data temporarily stored in a storage device of a display monitor to a utilization device including:

(a) power means for providing a constant voltage varying current power to the display monitor, said display monitor including analysis means for analyzing a patient sample and means for storing a binary representation of the analysis results in said storage device;

(b) initiation signal providing means for providing an initiation signal;

(c) modulation means responsive to the initiation signal providing means and to the storage device for modulating the current provided by said power means in accordance with the data temporarily stored in the storage device by selectively routing current through a load; and (d) detection means coupled to said power means for demodulating the modulated current and for providing an output signal corresponding to the stored data to the utilization device;

(e) said detection means and said utilization device being physically separate from said display monitor.

3. A data transmission interface for transmitting data temporarily stored in a storage device of a display monitor to a utilization device including:

(a) power means for providing a constant voltage varying current power to the display monitor;

(b) initiation signal providing means for providing an initiation signal;

(c) modulation means responsive to the initiation signal providing means and to the storage device for modulating the current provided by said power means in accordance with the data temporarily stored in the storage device by selectively routing current through a load, said modulation means being an amplitude shift keying modulator using carrier on/off keying to represent two binary values; and (d) detection means coupled to said power means for demodulating the modulated current and for providing an output signal corresponding to the stored data to the utilization device, said detection means including a narrow bandpass filter and a threshold detector, the Q of the filter and the threshold of the detector being chosen so that at least two carrier cycles are required to overcome the damped response of the filter to the point that the threshold is reached;

(e) said detection means and said utilization device being physically separate from said display monitor.

4. A data transmission interface for transmitting data temporarily stored in a storage device of a display monitor to a utilization device including:

(a) power means for providing a constant voltage varying current power to the display monitor;

(b) initiation signal providing means for providing an initiation signal;

(c) modulation means responsive to the initiation signal providing means and to the storage device for modulating the current provided by said power means in accordance with the data temporarily stored in the storage device by selectively routing current through a load;

(d) detection means coupled to said power means for demodulating the modulated current and for providing an output signal corresponding to the stored data to the utilization device; and (e) time and date generation means located at said detection means for providing a signal representing time and date information to said utilization device along with the output signal corresponding to the stored data;

(f) said detection means and said utilization device being physically separate from said display monitor.

5. A data transmission interface for transmitting data temporarily stored in a storage device of a display monitor to a utilization device including:

(a) power means for providing a constant voltage varying current power to the display monitor;

(b) initiation signal providing means for providing an initiation signal;

(c) modulation means responsive to the initiation signal providing means and to the storage device for modulating the current provided by said power means in accordance with the data temporarily stored in the storage device by selectively routing current through a load;

(d) detection means coupled to said power means for demodulating the modulated current and for providing an output signal corresponding to the stored data to the utilization device;

(e) said detection means and said utilization device being physically separate from said display monitor;

(f) error check code generation means responsive to the storage device for generating error check code information corresponding to the data temporarily stored in the storage device and wherein said modulation means is further responsive to the error check code generation means for further modulating said current with the error check code information;

(g) error detection means responsive to the demodulated output signal for providing an output error signal upon detecting an incorrect character or set of information;

(h) inhibit means responsive to the output error signal for preventing the utilization of an output signal by the utilization device until a further signal is provided by the initiation signal providing means; and (i) time and date generation means located at said detection means for providing a signal representing time and date information to said utilization device along with the output signal corresponding to the stored data; and wherein said inhibit means further prevents the utilization of the signal representing time and date information by the utilization device.

6. A data transmission interface for transmitting data temporarily stored in a storage device of a display monitor to a utilization device including:

(a) power means for providing a constant voltage varying current power to the display monitor;

(b) initiation signal providing means for providing an initiation signal;

(c) modulation means responsive to the initiation signal providing means and to the storage device for modulating the current provided by said power means in accordance with the data temporarily stored in the storage device by selectively routing current through a load, said modulating means including a microprocessor programmed to provide a fixed duration oscillating signal output in response to a first binary value of data stored in the storage device and a fixed duration steady state signal output in response to a second binary value of data stored in the storage device; and wherein said signal outputs are provided to route current through said load with the oscillating signal output; and (d) detection means coupled to said power means for demodulating the modulated current and for providing an output signal corresponding to the stored data to the utilization device;

(e) said detection means and said utilization device being physically separate from said display monitor.

7. The data transmission interface set forth in claim 6 wherein the load comprises a light emitting diode.

8. The data transmission interface set forth in claim 7, wherein said microprocessor is programmed in response to the absence of the initiation signal and the presence of a second control signal to turn on the light emitting diode to provide a light output which is sensed by the monitor and used in analyzing patient data.

* * * * *